Figure 3:
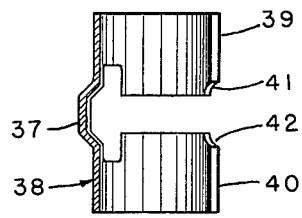

Feb. 6, 1962　　　M. E. WILLIAMS　　　3,020,073
SIMPLIFIED LATCH ASSEMBLY
Filed March 6, 1958　　　　　　　　　　　　2 Sheets-Sheet 1
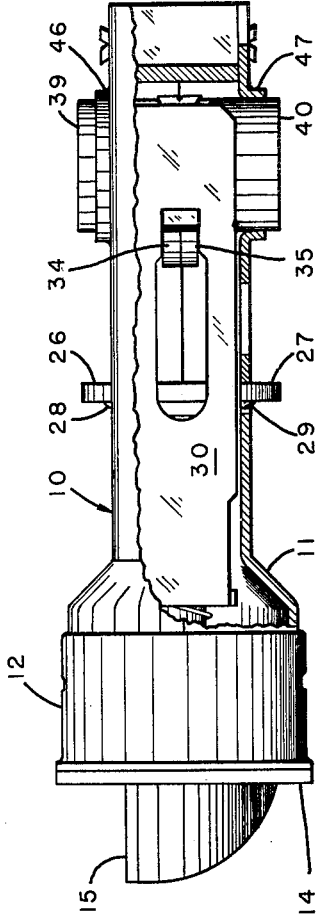
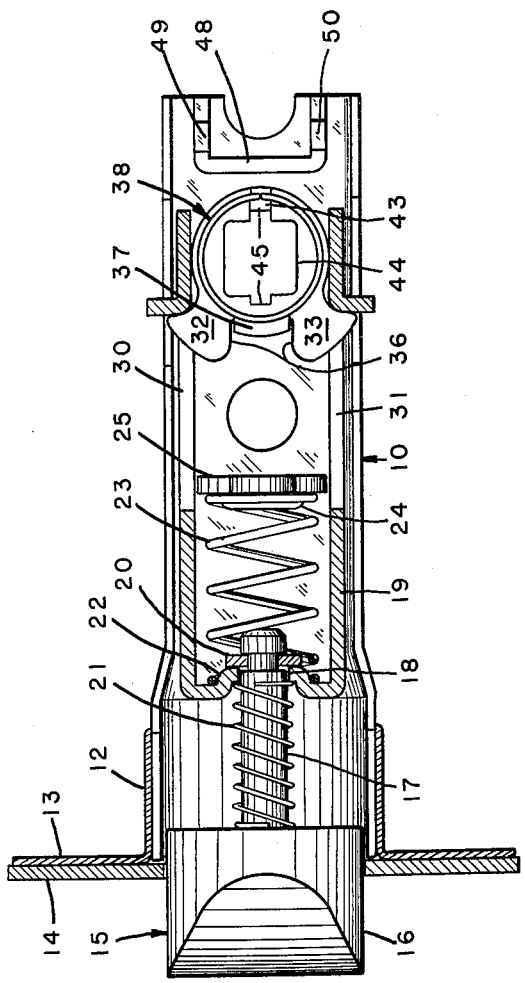
MURRAY E. WILLIAMS
*Inventor*
By
Atty.

Feb. 6, 1962 M. E. WILLIAMS 3,020,073
SIMPLIFIED LATCH ASSEMBLY
Filed March 6, 1958 2 Sheets-Sheet 2

MURRAY E. WILLIAMS
*Inventor*

By
Atty.

United States Patent Office 3,020,073
Patented Feb. 6, 1962

3,020,073
SIMPLIFIED LATCH ASSEMBLY
Murray E. Williams, Grand Rapids, Mich., assignor to Dexter Industries, Inc., Grand Rapids, Mich.
Filed Mar. 6, 1958, Ser. No. 719,596
3 Claims. (Cl. 292—169)

This invention relates to the construction of door latches. The general functional characteristics of a door latch embodying the invention are similar to those of standard devices, the primary purpose of the invention being to provide a structural arrangement tending toward the maximum simplicity, reliability, and durability. In realizing this objective, many of the components of a latch are given a dual function, and the arrangement has been devised with the assembly operations continually in mind.

The positioning of the inner end of a conventional retractor spring is determined, according to this invention, by a transverse plate supported in the latch housing, the plate having an irregularity which engages the end of the spring to maintain it in coaxial relationship with the latch mechanism. This spring seat serves the added function of a stop limiting inward movement of the latch bolt, and thus removes the necessity for the presence of additional abutment structure which might otherwise interfere with the space available for the bolt movement or the operation of the retractor spring. The opposite end of the latch spring (the outer end, or end nearest to the bolt) is positioned by a formed portion of the transverse section of the retractor which engages the end of the spring to position it in a fashion similar to the locating function of the spring seat. The concave (or front) face of the retractor caused by the formation of this area is utilized to locate and confine the inner end of the bolt spring, and also has the effect of increasing the space available to accommodate this spring.

Another feature of the invention resides in the construction of the rollback sub-assembly. According to this invention, this portion of the mechanism includes a split journal member which engages the bearings formed in the sides of the latch housing, and preferably a pair of separable cam members which are received between the opposite journal sections of the journal member. The cam portions are merely placed in position as a sub-assembly, and the engagement of the sub-assembly with the retractor mechanism results in the retention of the sub-assembly components in the operating position regardless of the angular position about the knob axis.

The several features of the invention will be discussed in detail through an analysis of the particular embodiments illustrated in the accompanying drawings. In the drawings:

FIGURE 1 presents a top view of a latch mechanism, embodying the invention, with a portion of the case broken away to show the interior assembly.

FIGURE 2 is a section on a vertical plane through the same mechanism as shown in FIGURE 1, FIGURES 1 and 2 being in projection.

FIGURE 3 presents an axial section through the journal member of the rollback sub-assembly.

Figure 4:
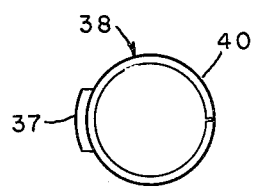

FIGURE 4 presents an end view of the same unit shown in FIGURE 3.

Figure 5:
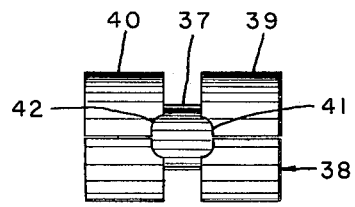

FIGURE 5 presents a side view of the journal member shown in FIGURES 3 and 4, FIGURES 3, 4, and 5 being in projection.

Figure 6:
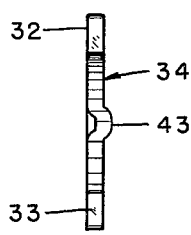

FIGURE 6 presents a side view of one of the cam members of the rollback sub-assembly.

Figure 7:
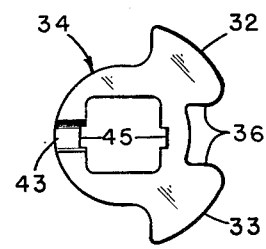

FIGURE 7 presents an elevation of the same member as shown in FIGURE 6, FIGURES 6 and 7 being in projection.

Referring to FIGURES 1 and 2, the illustrated latch assembly includes a split housing having the opposite sides 10 and 11. The front collar 12 holds the outer portion of the case sections in assembled relationship, and the flange 13 (preferably formed integrally with the collar 12) facilitates the mounting of the latch in the door, in conjunction with the front plate 14. The front plate has aperture shaped to receive the bolt 15 in sliding relationship, the bolt including the head 16 and the stem 17 which extends inwardly and in sliding engagement with the central aperture 18 in a transverse portion of the retractor 19. A retaining washer 20 engages a groove in the inner end of the stem 18 as shown to maintain the assembled relationship of the stem and the retractor against the action of the bolt spring 21. The front (or concave) side of an indented area 22 in the transverse portion of the retractor 19 receives the inner end of the spring 21 to confine it and locate the inner end of the spring 21 so that the function need not be performed by the bolt stem and thereby create a drag or binding action through the possible friction of the spring on the stem during its reciprocating movement. The depth of the indentation provided by the front portion of the formed area 22 also adds to the available space for the length of the spring 21.

The rear face of the formed area 22 engages the inside of the retractor spring 23, and maintains the spring in isolation from the retaining washer 20. The opposite end of the retractor spring 23 is located by the projection 24 on the spring seat 25. The spring seat 25 is positioned so that the end of the projection 24 serves the added function of an abutment for cooperation with the inner end of the bolt stem 17 to establish a limit to the inward movement of the bolt. The spring seat 25 is retained in position through the engagement of the opposite ends 26 and 27 within suitable openings in the latch housing, these openings also having an irregularity on the forward side to receive the raised portions 28 and 29. The presence of these portions makes it impossible to assemble the spring seat in a position in which the projection 24 faces inward.

The arms 30 and 31 of the retractor extend to the rear, and engage the portions 32 and 33 of the cam members of the rollback assembly. This sub-assembly includes a pair of similar cam members formed as shown in FIGURES 6 and 7. Two of these members are used in side-by-side relationship in order to present a greater area of cleanly-sheared metal. The blanking operation in which the contours of sheet metal pieces are formed in dies results in a relatively thin band of material which conforms to the exact design contour, the remainder of the thickness of the material being broken away with a resulting roughness. The use of two thinner members has the effect of providing a greater area of smooth and cleanly-sheared material than would be the case if a single thickness were used of similar overall dimensions.

The cam members 34 and 35 each have an opening 36 which receives the central connecting portion 37 of the journal member 38. The structure of this member is shown in FIGURES 3, 4, and 5. It includes the opposite journal portions 39 and 40, which are spaced to receive the cam members 34 and 35. The irregularities 41 and 42 receive the protrusions 43 on the cam members, this engagement combining with the engagement of the connecting portion 37 with the opening 36 to complete the angular location of the cam members with respect to the journal member against the application of torque through the knob shaft which engages the square opening 44 of the cam members. As an incidental matter, the notches 45 on the opposite sides of the opening 44 are for receiving the end of a screwdriver. During the period in which a building is under construction, a substantial time usually exists in which the hardware is only partially installed in the doors. The absence of knobs and a knob-shaft require that the mechanism be operated by some other instrument. A screwdriver is ordinarily used for this purpose, and the engagement of the end of it with the notches 45 facilitates the manipulation of the latch without requiring that the screwdriver be jammed into the diagonal of the square opening 44.

When the rollback sub-assembly is inserted in the housing in assembled relationship with the retractor, the journal portions 39 and 40 will engage the bearings 46 and 47, respectively, and the tension of the retractor spring will maintain the cam portions in position solidly against the connecting portion 37 of the journal member. As long as this condition persists, an effective inter-engagement for the transfer of torque between the journal member and cam portions exists. The confinement of the cam portions by the surrounding structure maintains the relationship as the rotation of the knob is continued. The U-shaped clip 48 at the rear of the case is provided with ears on each side as shown at 49 and 50 in FIGURE 2 which are staked over as shown in FIGURE 1 on the assembly of the housing portions to confine the inward portion of the case and thereby maintain the assembled relationship of the components.

The particular embodiments of the present invention which have been illustrated and discussed herein are for illustrative purposes only and are not to be considered as a limitation upon the scope of the appended claims. In these claims, it is my intent to claim the entire invention disclosed herein, except as I am limited by the prior art.

I claim:

1. A latch mechanism, comprising: a case; a retractor slideably mounted in said case, and having spaced opposite arms; a bolt slideably mounted with respect to said case and operably connected to said retractor; a retractor spring biasing said retractor outwardly with respect to said case; rollback means rotatably received in said case and engaging said retractor arms, said rollback means including coaxial cylindrical journal sections spaced from each other along the axis thereof and including a connecting member joining said journal sections, said rollback means also including a plurality of cam members having a central driving aperture and received between said journal sections, and also having a cut-out receiving said connecting member, said cam members also having spaced projections on opposite sides of said cut-out for engaging the arms of said retractor, respectively, said retractor spring tending to urge said retractor outwardly and thereby urge said cam members against said connecting member, and said rollback means also including interengaging means on said journal sections and cam members on the opposite side thereof from said connecting portion for preventing relative angular displacement of said cam means with respect to said journal sections.

2. A latch mechanism, comprising: a case; a retractor slideably mounted in said case, and having spaced opposite arms; a bolt slideably mounted with respect to said case and operably connected to said retractor; a retractor spring biasing said retractor outwardly with respect to said case; and rollback means rotatably received in said case and engaging said retractor arms, said rollback means including coaxial cylindrical journal sections spaced from each other along the axis thereof and including a connecting member joining said journal sections, said rollback means also including a plurality of cam members in driving relationship with said retractor having a central driving aperture and received between said journal sections, and also having an external notch receiving said connecting member, said cam members also having spaced projections on opposite sides of said cut-out for engaging the arms of said retractor, respectively, said retractor spring tending to urge said retractor outwardly and thereby urge said cam members against said connecting member and torque transmitting means interconnecting said journal sections and cam members.

3. A latch mechanism, comprising: a case; a retractor slideably mounted in said case, and having spaced opposite arms; a bolt slideably mounted with respect to said case and operably connected to said retractor; a retractor spring biasing said retractor outwardly with respect to said case; and rollback means rotatably received in said case, said rollback means including coaxial cylindrical journal sections spaced from each other along the axis thereof and including a connecting member joining said journal sections, said rollback means also including at least one cam member in driving relationship with said retractor having a central driving aperture and received between said journal sections, and also having an external notch receiving said connecting member, said cam member also having spaced projections for engaging the arms of said retractor, respectively, said retractor spring tending to urge said retractor outwardly and thereby urge said cam member against said connecting member and torque transmitting means interconnecting said journal sections and cam members.

References Cited in the file of this patent

UNITED STATES PATENTS

| | | |
|---|---|---|
| 733,142 | Caley | July 7, 1903 |
| 2,578,873 | Young | Dec. 18, 1951 |
| 2,715,036 | Miller | Aug. 9, 1955 |
| 2,759,751 | Kaiser | Aug. 21, 1956 |